Patented Jan. 8, 1952

2,582,139

UNITED STATES PATENT OFFICE 2,582,139

RESINOUS PRODUCTS OF THE REACTION OF STYRENE WITH RESINS DERIVED FROM BITUMINOUS COALS OF UTAH

Ernest D. Lee, Sparta, and Rupert J. Schefbauer, Jr., Hasbrouck Heights, N. J., assignors to Interchemical Corporation, New York, N. Y., a corporation of Ohio No Drawing. Application July 8, 1949, Serial No. 103,754

12 Claims. (Cl. 260—23)

This invention relates to synthetic resins and particularly to such resins formed by the conjoint polymerization of monomeric styrene with a natural resin such as the coal resins that are found in Utah coals.

Heretofore it has been known to polymerize styrene, either alone or conjointly with other polymerizable hydrocarbon monomers, especially those substances containing one or more ethylenically unsaturated groups in the molecules, to form styrene polymers and copolymers. These polymers and copolymers have particular properties such as chemical resistance, water resistance, flexibility, etc. which would be very desirable to impart to protective coatings and inks. However, these polymers have poor compatibility with the oil vehicles commonly used in coating and ink compositions. It is therefore an object of the present invention to provide a new resin containing copolymerized styrene which is compatible with oils and the usual varnish, lacquer, paint, and ink vehicles. Other objects of the invention will be apparent as the description of the invention proceeds.

The objects of our invention are attained as a result of our discovery that monomeric styrene can be copolymerized with resins derived from coals such as are found in Utah to give copolymers that are compatible with the usual ink and coating composition vehicles. When these styrene-coal resin copolymers are cooked into drying or semi-drying oils, such as tung oil or linseed oil, the resulting homogeneous oleoresinous vehicle can be used in the formulation of paints, varnishes, lacquers, inks, and the like, in the usual manner. Films formed from such compositions possess good flexibility, water resistance and chemical resistance.

In the practice of our invention we prefer to use inhibitor-free monomeric styrene. Since styrene, as it is normally furnished by the manufacturer, contains an inhibitor of polymerization, we prefer to remove the inhibitor, as by distillation of the styrene from the non-volatile inhibitor. This freshly distilled styrene is used directly in our polymerization process.

The coal resin used in our invention can be characterized as a natural resin occurring admixed with certain bituminous coals (notably that from the Utah coal fields between Castlegate on the north and Salina Canyon on the south) and consisting substantially of carbon (ca. 87–88%) and hydrogen (ca. 11–12%), and having an acid number of the order of 6–8, and an iodine number of the order of 100–130 (Wijs method).

This resin which occurs in Utah coals (up to about 10%) is commonly recovered by crushing the coal to an optimum texture of fineness, effecting separation of a crude resin concentrate from the crushed coal by froth flotation, and solvent extraction of the crude resin concentrate with suitable solvent to obtain a soluble resin substantially free from coal and minerals (95–100%). One such process based on this procedure yields a resin soluble in saturated petroleum hydrocarbon solvent (consisting essentially of hexanes, not more than 25% of which is cyclic hydrocarbon). This resin, which will hereinafter be referred to as the hexane soluble resin can be used in the invention. Other grades or fractions of the coal resin may be used however. For instance, it is obvious that if the resin has been decolorized during its course of extraction from the coal, as by filtering the solution of hexane soluble resin through fuller's earth or activated heat treated clay (disclosed in E. D. Lee United States Patent 2,409,216, issued October 15, 1946), the resulting decolorized resin can be used in the process of the invention. Also resins that have been obtained by extraction of the crude resin concentrate with other solvents can be employed in the present invention instead of the hexane soluble resin. For instance, the resin resulting from the extraction of the resin with 2-methyl pentane (isohexane) as described in our copending application Serial No. 746,857, filed May 8, 1947, now Patent No. 2,505,865, may be used in the invention.

Advantageously, the coal resin is treated with an oxygen-containing gas prior to reacting it with styrene. Such oxygen treatment can be carried out for instance according to our copending United States patent application, Serial No. 17,375, filed March 26, 1948, now Patent No. 2,488,546, wherein a process comprising subjecting coal resin, spread in thin layers, to an oxygen-containing gas at temperatures of 5° to 15° C. below the melting point of the resin, is described and claimed. Treatment of the coal resin with an oxygen-containing gas followed by reaction with styrene yields a styrenated coal resin product which is more compatible with drying oils, especially tung oil, in that clearer varnish films can be produced from the oleoresinous varnish prepared from the styrenated oxygenated resin that can usually be obtained using coal resin which has not been treated with oxygen.

The copolymerization of styrene with the coal resin preferably is carried out by heating a solution of the coal resin or the oxidized coal resin and styrene in a hydrocarbon solvent in the presence of from 0.1 to 5% by weight, based on reactants of an amphoteric metal halide catalyst such as aluminum chloride, boron trifluoride, and the like, and the organic solvent complexes of such catalysts, e. g. boron trifluoride diethyl ether complex. The reactants are preferably polymerized in ratios of from 5 to 50 parts styrene to 95 to 50 parts of coal resin. The new resins are compatible with drying and semi-drying oils and contain enough copolymerized styrene to impart good chemical and water resistance, and flexibility to cured films. The varnishes obtained by cooking the resins into drying and semi-drying oils can be compounded with other conventional varnish ingredients such as driers and pigments.

Suitable temperatures for conducting the polymerization are of the order of 50 to 200° C., however, we prefer to carry out the polymerization at temperatures of 120° to 160° C.

Although we prefer to carry out the polymerization in a solvent such as hexane it is also possible to dispense with solvent entirely. Solvent polymerization is preferable chiefly because the temperature is more easily controlled.

Any suitable method may be used to purify the copolymer, i. e. to separate solvent and/or catalyst from the polymer. For instance, the solvent may be distilled off under atmospheric or reduced pressure. Catalyst is suitably removed by washing the solution of the resin with water or aqueous or alcoholic alkali.

Copolymers formed by the process of the invention are soluble in oils, and hydrocarbon solvents such as petroleum hydrocarbons, both aliphatic and aromatic. The resins are insoluble in such solvents as alcohols, ethers, esters, and ketones.

The following examples, in which the parts are by weight, further illustrate the manner in which our invention may be practiced.

*Example I*

| | Parts |
|---|---|
| Styrene, inhibitor-free | 110 |
| Hexane soluble coal resin | 440 |
| n-Hexane | 220 |
| Aluminum chloride, anhydrous | 5 |

The coal resin was dissolved in the styrene and hexane, the aluminum chloride then added, and the mixture heated to 75° C. for about 7 hours. The resulting solution of copolymer was washed with a weak solution of ammonium hydroxide in ethyl alcohol and then with water. The hexane solvent, and traces of alcohol and water were removed by distillation to leave a solid dark colored resin.

*Example II*

To a 60% solution of hexane soluble coal resin in monomeric styrene was added 1% of boron trifluoride-diethyl ether complex (containing about 37% boron trifluoride) and the solution heated slowly to about 170-175° C. (6 hours). The reaction mixture was then cooled to 120° C. and enough toluene was added to make a 30% toluene solution. Five per cent by weight of calcium hydroxide was then added and the solution was stirred for 1 to 1½ hours at 65° C., then filtered and the filtrate vacuum distilled to remove the toluene. The yield of non-volatile resin was 98%. This copolymer resin was compatible with such drying oils as linseed oil and China-wood oil.

*Example III*

To a 50-50 mixture of styrene and hexane soluble coal resin was added 1% by weight of boron trifluoride-diethyl ether complex (containing about 37% of boron trifluoride) and the solution heated slowly to about 150 to 155° C. (heating time 7½ hours). The resin was then dissolved in toluene, agitated with calcium hydroxide, filtered and distilled in a manner similar to that used in Example II. The yield of resin having a melting point of 100 to 105° C. was about 98%. The resin is readily compatible with drying oils.

Varnishes of 25 gallon oil length with both tung oil and linseed oil were made using the resins of the above examples. These varnishes could be cut to any desired consistency with hydrocarbon solvent and gave films having excellent flexibility, and chemical and water resistance.

*Example IV*

To a solution containing 150 parts by weight of oxygenated Utah coal resin and 150 parts of styrene were added 6 parts by weight of boron trifluoride diethyl ether complex (48% by weight of boron trifluoride). Then the solution was heated gradually over a period of one hour and forty-five minutes to 150° C. Enough toluene was then added to make a 35% solution. Fifteen parts by weight of calcium hydroxide were then added and the mixture agitated one hour at 65° C. and then filtered. The filtrate was then vacuum distilled to remove the volatile solvent. The melting point of the resin remaining as residue was 100-105 (capillary method).

The oxygen-treated coal resin used in Example IV was obtained by subjecting a hexane extracted coal resin, having a melting point of 160-165° C., to air at 150° C. for 6 hours.

A tung oil varnish of 25 gallon oil length was prepared by cooking the appropriate amount of the resin obtained in Example IV with tung oil at varnish cooking temperatures. Films of the finished varnish, when coated on tin plate and baked for one-half hour at 350° C., were clear, hard, and compatible.

We claim:

1. A process for improving the properties of the hydrocarbon resins derived from bituminous coals of Utah, consisting substantially of carbon and hydrogen, having an acid number about 6-8, and an iodine number about 100-130; which comprises heating 50 to 95 parts of the coal resin with 50 to 5 parts of styrene at 50° to 200° C., in the presence of catalytic amounts of an amphoteric metal halide catalyst.

2. The process as claimed in claim 1, wherein the catalyst is boron trifluoride.

3. A process for improving the properties of the hydrocarbon resins derived from bituminous coals of Utah, consisting substantially of carbon and hydrogen, having an acid number about 6-8, and an iodine number about 100-130; which comprises heating 50 to 95 parts of the partially oxidized coal resin admixed with 50 to 5 parts of styrene at 50° to 200° C., in the presence of catalytic amounts of an amphoteric metal halide catalyst.

4. The process as claimed in claim 3, wherein the catalyst is boron trifluoride.

5. The resinous product resulting from the heating of a mixture of 50 to 95 parts of the hydrocarbon resin derived from bituminous coals of Utah, consisting substantially of carbon and hydrogen, having an acid number about 6-8, and an iodine number about 100-103; and 50 to 5 parts of styrene at 50° to 200° C., in the presence of catalytic amounts of an amphoteric metal halide catalyst.

6. The resinous product as claimed in claim 5, resulting when the catalyst is boron trifluoride.

7. The resinous product resulting from the heating of a mixture of 50 to 95 parts of the partially oxidized hydrocarbon resin derived from bituminous coals of Utah, consisting substantially of carbon and hydrogen, having an acid number about 6-8, and an iodine number about 100-130; and 50 to 5 parts of styrene at 50° to 200° C., in the presence of catalytic amounts of an amphoteric metal halide catalyst.

8. The resinous product as claimed in claim 7, resulting when the catalyst is boron trifluoride.

9. A varnish comprising a drying oil and a resinous product obtained by heating a mixture of 50 to 95 parts of the hydrocarbon resin derived from bituminous coals of Utah, consisting substantially of carbon and hydrogen, having an acid number about 6-8, and an iodine number about 100-130; and 50 to 5 parts of styrene at 50° to 200° C., in the presence of catalytic amounts of an amphoteric metal halide catalyst.

10. A varnish as claimed in claim 9, resulting when the catalyst is boron trifluoride.

11. A varnish comprising a drying oil and a resinous product obtained by heating a mixture of 50 to 95 parts of the partially oxidized hydrocarbon resin derived from bituminous coals of Utah, consisting substantially of carbon and hydrogen, having an acid number about 6-8, and an iodine number about 100-130; with 50 to 5 parts of styrene at 50° to 200° C., in the presence of catalytic amounts of an amphoteric metal halide catalyst.

12. A varnish as claimed in claim 11, resulting when the catalyst is boron trifluoride.

ERNEST D. LEE.
RUPERT J. SCHEFBAUER, JR.

REFERENCES CITED

The following references are of record in the file of this patent:

UNITED STATES PATENTS

| Number | Name | Date |
|---|---|---|
| 2,461,551 | Lee et al. | Feb. 15, 1949 |